United States Patent [19]

Payne

[11] 4,181,060

[45] Jan. 1, 1980

[54] HELICAL ANCHOR

[76] Inventor: William J. Payne, 1328 Clearview Dr., Greensburg, Pa. 15601

[21] Appl. No.: 837,809

[22] Filed: Sep. 29, 1977

[51] Int. Cl.² ............................................. F16B 13/06
[52] U.S. Cl. ............................................ 85/64; 85/72
[58] Field of Search ................... 85/64, 72, 61, 73, 74; 228/125, 112, 159, 160, 162; 10/86 CL, 86 R

[56] References Cited

U.S. PATENT DOCUMENTS

| | | | |
|---|---|---|---|
| 2,690,693 | 10/1954 | Campbell | 85/64 |
| 3,175,284 | 3/1965 | Cotousky | 228/125 X |
| 3,295,613 | 1/1967 | Anderson | 228/112 X |
| 3,683,740 | 8/1972 | Martin | 85/72 |
| 3,881,393 | 5/1975 | Campbell | 85/64 |
| 3,898,907 | 8/1975 | Fischer | 85/64 |

FOREIGN PATENT DOCUMENTS 2211713   9/1973   Fed. Rep. of Germany .............. 85/64

*Primary Examiner*—Roy D. Frazier
*Assistant Examiner*—William E. Lyddane
*Attorney, Agent, or Firm*—Fay & Sharpe

[57] ABSTRACT

A helical anchor of the type in which a helical coil surrounds a connecting bolt in attachment with a nut element. Rotation of the connecting bolt causes the coil to expand radially outwardly into gripping engagement with a side wall into which the anchor is received. The end turn of the coil is welded to the nut element. A generally annular notch is provided at approximately the heat affected zone of the weld. The weld is fracturable. Upon take-up of the anchor a break in the weld occurs after which time the notch advantageously provides for outward expansion of the end turn of the coil.

13 Claims, 12 Drawing Figures

HELICAL ANCHOR

BACKGROUND OF THE INVENTION

This invention relates to helical anchors of the type in which a helical coil cooperates with a nut element carried by a connecting bolt and wherein rotation of the connecting bolt causes the coil to expand radially outwardly into gripping engagement with the side wall into which the anchor is received.

The U.S. Pat. No. 2,690,693 to Campbell discloses a fastener or anchor including a helical spring wrapped around a pin.

In the U.S. Pat. No. 3,881,393 to Campbell there is shown an improvement of the earlier Campbell structure in which special provision is made for the radial expansion of the innermost or end turn of the coil in order to enhance the holding capacity of the coil.

The outward expansion of the end turn or the last several turns of a helical coil type fastener or anchor is desirable from the viewpoint of contributing to increased holding capacity of the coil. Holding capacity depends upon frictional engagement between the coil and the side wall into which the anchor is received. It is, therefore, desirable to provide for as much engagement as is possible over the largest area.

The end portion of the helical coil must be attached, of course, to the nut element of the anchor assembly in order to promote the outward expansion of the coil as the connecting bolt is turned. It is the connection between the coil and the nut element that inhibits the outward expansion of the last turns of the coil since the rigidity of the coil increases markedly at the end thereof in the vicinity of the connection with the nut element.

The U.S. Pat. No. 3,881,393 to Campbell recognizes the desirability of providing for the outward expansion of the last turn of the coil in order to increase the holding capacity of the expansion fastener or anchor. However, there are a number of shortcomings in the structure shown in Campbell U.S. Pat. No. 3,881,393.

A principal shortcoming of the structure shown in Campbell U.S. Pat. No. 3,881,393 is the fact that the provision made for outward expansion of the last turn of the helical coil sacrifices somewhat the integrity of the joint between the coil and the nut element. The structure shown in Campbell U.S. Pat. No. 3,881,393 does not provide for a sufficiently secure joint between the nut element and the helical coil to prevent slippage of the coil relative to the nut in installation.

A further shortcoming of the structure shown in Campbell U.S. Pat. No. 3,881,393 is the fact that the mode of connection between the coil and the nut does not lend itself to assembly line techniques producing a reliable joint on a production basis.

A still further limitation in the structure of Campbell U.S. Pat. No. 3,881,393 is the fact that both the helical coil and the nut element require extensive machining and/or preparation prior to the joining of these members together. These machining and preparation steps increase the cost of the anchor.

A still further limitation in Campbell U.S. Pat. No. 3,881,393 is the fact that the Campbell structure is incapable of dealing with both bending forces and circumferential expansion forces (or hoop stress) acting on the coil during take-up. Campbell in fact slows the generation of the component of bending which is desirable. Campbell apparently fails to recognize this fact.

This invention is designed to provide a helical anchor wherein the objectionable features of the structure shown in the Campbell U.S. Pat. No. 3,881,393 are eliminated.

SUMMARY OF THE INVENTION

Briefly summarized this invention is directed to a helical anchor and a method of assembly of a helical anchor of the type comprising a connecting bolt, helical coil and nut element. The helical coil surrounds the connecting bolt and is defined by a plurality of axially spaced turns including an end turn and a plurality of adjacent turns. The helical coil is adapted to expand radially outwardly into gripping engagement with a side wall into which the anchor is received. The end turn of the helical coil is secured to the nut element of the anchor by means of an annular fracturable weld. During take-up of the anchor the weld breaks. The placement of a notch at the weld advantageously provides for cooperating ramp surfaces in the nut element and the coil whereby there is an outward expansion of the end turn of the coil during take-up of the anchor. As a consequence virtually the entire coil is brought into gripping engagement with the side wall. The method of the invention is directed to method steps for the attachment of the coil to the nut element of the anchor assembly.

DESCRIPTION OF THE DRAWINGS

A more complete description of the invention will now be made with reference to the accompanying drawings in which.

DESCRIPTION OF THE PREFERRED EMBODIMENT

Figure 9:
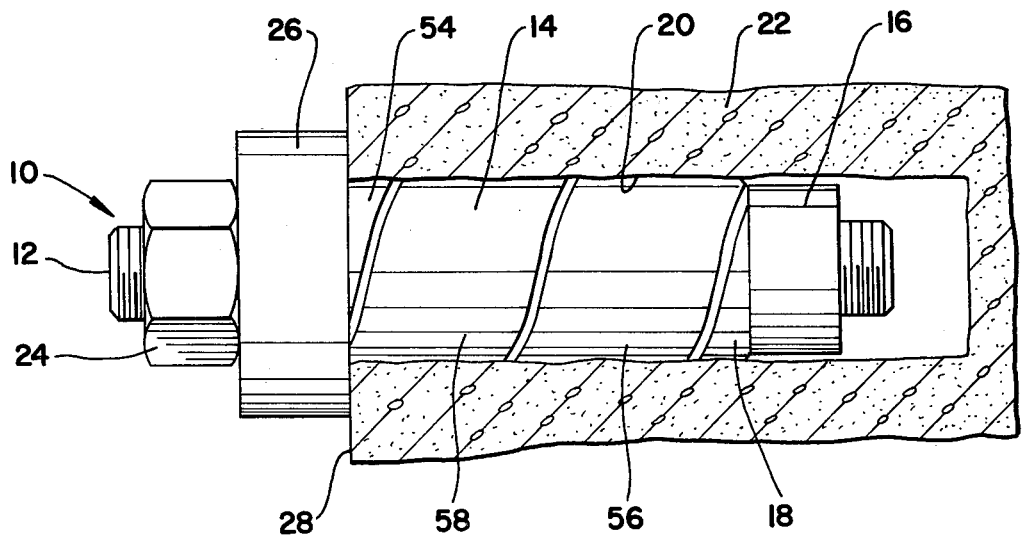
FIG. 9 is an elevational view partly in section showing the helical anchor of this invention used as a concrete anchor.

Turning first to FIG. 9 the helical anchor of this invention is shown in relation to a concrete anchor for securing a support member to a concrete surface. The helical anchor, which is generally designated 10 in FIG. 9, is comprised of a connector element or connecting bolt 12, helical coil 14 which surrounds the connecting bolt 12, and a bearing element or nut element 16 which is threadedly received on connecting bolt 12 and which, in initial assembly, is welded to the end turn 18 of helical coil 14. It should be appreciated that rotation of connecting bolt 12 causes helical coil 14 to expand radially outwardly into gripping engagement with side wall 20 defined in concrete 22 into which the anchor is received. Rotation of bolt 12 may be accomplished in many different ways. A slot (not shown) may be defined in the outer end of the bolt. Alternately, wrench engaging surfaces may be defined on the bolt surface or a head may be provided at the end of the bolt for engagement by a wrench. An attaching nut 24 is threadedly received about the outermost end of connecting bolt 12 in order to secure support member 26 to the concrete surface 28.

It should be appreciated that the concrete anchor embodiment of FIG. 9 is shown merely for purposes of illustration. The helical anchor of this invention may take many different forms and may be employed in different environments.

Figure 1:
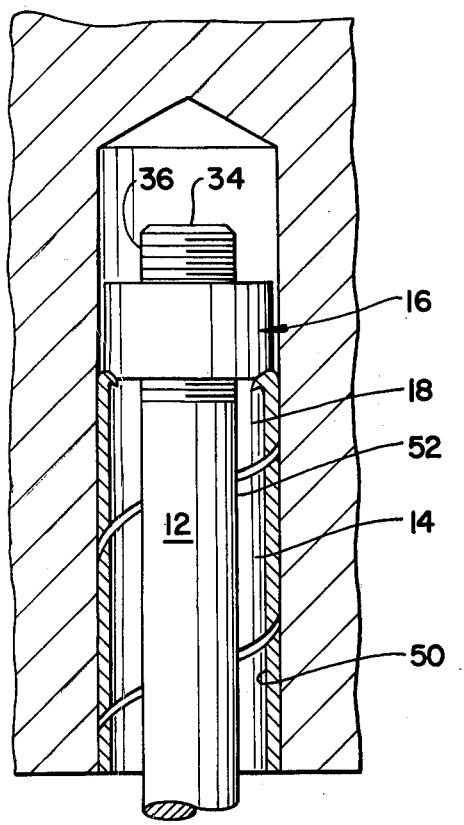
FIG. 1 is an elevational view partly in section, and showing the end turn and nut element of the anchor assembly of the invention in an assembled condition.
Figure 2:
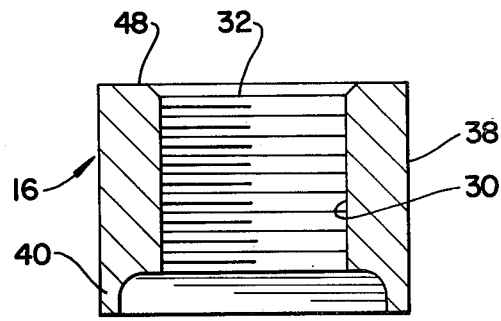
FIG. 2 is an elevational cross-sectional view of the nut element of the anchor assembly of the invention.

Turning to FIG. 2 the nut element 16 is shown in isolated view. The nut element includes a generally cylindrical internal wall 30 having threads 32 which are complementary to threads 36 which are defined at the inner end 34 of connecting bolt 12 (FIG. 1). It should be appreciated, therefore, that when assembled to the connecting bolt nut element 16 is freely rotatable with respect to such bolt.

The external surface 38 of nut element 16 is generally cylindrical. Skirt section 40 depends from one end of nut element 16 in the manner shown in FIG. 2.

Figure 3:
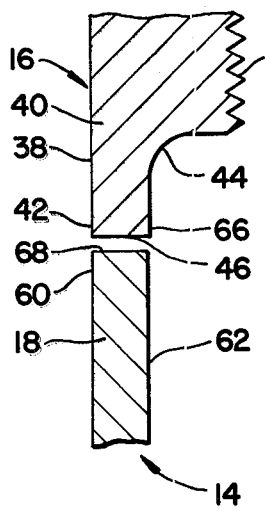
FIG. 3 is a fragmentary elevational cross-sectional view showing the skirt section of the nut element and the end turn of the helical coil prior to welding.

As is shown in greater detail in FIG. 3 skirt section 40 is defined by an essentially cylindrical outer surface 42 which is generally coplanar with surface 38 of the body of the nut element 16. The internal surface of skirt section 40 is defined by a relieved portion 44 which extends from the internal wall 30 outwardly to surface 66 in order to define a skirt section having a reduced thickness from that of the body of the nut element. An attachment area 46 is thereby defined by skirt section 40. The attachment area is generally annular in configuration and is essentially transverse to the axis of nut element 16.

The uppermost end of nut element 16 as viewed in FIG. 2 is defined by an essentially planar surface 48 which is positioned essentially transverse to the axis of the nut element.

Attention will now be directed to the helical coil of the anchor of the invention which is shown in greater detail in FIG. 1. In the preferred embodiment of the invention as shown in FIG. 1 helical coil 14 is defined by a coil blank which, when shaped, forms a coil having a generally cylindrical internal surface 50 and a generally cylindrical external surface 52. The coil may be characterized, therefore, as a generally flat helical wound strip having a plurality of axially spaced turns. For purposes of description the innermost turn 18 (FIG. 1) adjacent nut element 16 will be termed an end turn. Referring to FIG. 9 it will be seen that the end turn 18 is the turn furthest from the entry of the hole into which the anchor is received. With further reference to FIG. 9 it will be seen that coil 14 also includes a free end 54 and a plurality of turns 56, 58 which are adjacent end turn 18. The embodiment of FIG. 9 shows two turns 56, 58 which are adjacent end turn 18. It should be appreciated that, depending upon the axial width of the turns and the axial length of the anchor, the number of turns may vary.

In assembly end turn 18 is welded to nut element 16 in order to secure these members together. Free end 54 is not attached to any member. The manner of assembly of the coil to the nut element will now be described with reference to FIGS. 3–5.

Referring first to FIG. 3 it will be remembered that nut element 16 includes a skirt section 40 which defines an attachment area 46 positioned essentially transverse to the axis of the nut element. End turn 18 of helical coil 14 is defined by an external surface 60 and an internal surface 62. As shown in FIG. 3 external surface 60 is substantially coplanar with external surface 38 of nut element 16. Similarly internal surface 62 of end turn 18 is substantially coplanar with surface 66 defined by relieved portion 44 of the nut element 16. An attachment area 68 is defined by end turn 18 and is positioned substantially transverse to the axis of end turn 18. As will be appreciated from a study of FIG. 3 the respective axes of nut element 16 and end turn 18 are substantially coaxial. The respective attachment areas 46, 68 are, therefore, substantially parallel when the nut element 16 is aligned with helical coil 14 in the position shown in FIG. 3. As will further be appreciated from a study of FIG. 3 the surface dimensions of attachment area 46 are approximately equal to the surface dimensions of attachment area 68. Stated in other words, the attachment areas 46, 68 are approximately equal to one another. This relationship of the attachment areas is advantageous in the friction welding process which is employed in the manufacture of the preferred embodiment of the invention as will now be described.

In the manufacture of the helical anchor of this invention end turn 18 is welded to skirt section 40 by means of a friction welding process. Friction welding is a process in which the heat for welding is produced by direct conversion of mechanical energy to thermal energy at the interface of the workpiece without the application of electrical energy or heat from other sources, to the workpieces. Friction welds are made by holding a non-rotating workpiece in contact with a rotating workpiece under constant or gradually increasing pressure until the interface reaches welding temperature and then stopping rotation to complete the weld. The frictional heat developed at the interface rapidly raises the temperature of the workpieces, over a very short axial distance, to values approaching, but below, melting range; welding occurs under the influence of a pressure that is applied while the heated zone is in the plastic temperature range.

Friction welding is classified as a solid state welding process, in which joining occurs at a temperature below the melting point of the work metal. If incipient melting does occur, there is no evidence in the finished weld, because the metal is worked during the welding stage.

Figure 4:
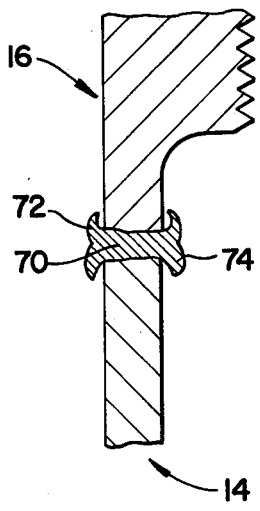
FIG. 4 is a fragmentary elevational cross-sectional view showing the skirt section of the nut element and the end turn of the helical coil after welding.

Applicant causes the end turn 18 of helical coil 14 to become welded to skirt section 40 of nut element 16 by means of a friction welding process which produces a generally annular weld 70 between these elements as is shown in FIG. 4. Because applicant chooses to weld similar metals and due to the fact that the respective attachment areas 46, 68 are approximately equal, the amount of weld upset is about the same on both sides of the bond line as is shown in FIG. 4. As a consequence a uniform weld is achieved.

Figure 5:
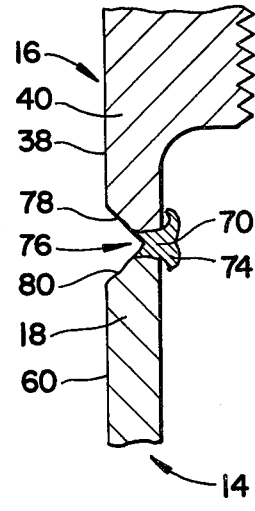
FIG. 5 is a fragmentary elevational cross-sectional view showing the skirt section of the nut element and the end turn of the helical coil after partial flash removal and the placement of a notch adjacent the weld.

As shown in FIG. 4 the friction welding process produces a weld 70 having flash 72, 74 on either side of the weld. After the formation of weld 70 applicant causes flash 72 at the exterior of the welded joint to be removed using any conventional flash removal process. Thereafter, as is shown in FIG. 5, a notch 76 of generally annular configuration is formed substantially adjacent weld 70. Notch 76 is defined by tapering side walls 78, 80. Any conventional metal shaping process may be used for purposes of defining notch 76 including, but not limited to, cutting tools. Notch 76 may be defined entirely in the heat affected zone of weld 70 or, alternately, may be defined partially in the heat affected zone and partially in skirt section 40 and end turn 18.

After the helical coil 14 has been welded to nut element 16 and the resulting nut-coil subassembly has been notched as shown in FIG. 5 final assembly of the helical anchor simply requires the advancement of connecting bolt 12 into nut element 16 in the manner shown in FIG. 1. The completed assembly consisting of helical coil 14, nut element 16 and connecting bolt 12 is then ready for use.

OPERATION

The operation of the helical anchor of this invention will now be described with reference to FIGS. 6-9.

Referring initially to FIG. 9 the helical anchor assembly comprising the helical coil 14, nut element 16 and connecting bolt 12 is inserted into a hole which is suitably prepared in concrete or the like for reception of the anchor. It should be understood that when the helical anchor is initially inserted into the receiving side wall 20 the condition of the weld between the end turn 18 of helical coil 14 and skirt section 40 of nut element 16 is as shown in FIG. 5.

As the anchor is placed under load through rotation of the connecting bolt 12 helical coil 14 is caused to be expanded outwardly into gripping engagement with side wall 20 (FIG. 9) defining the hole into which the anchor is received.

Figure 6:
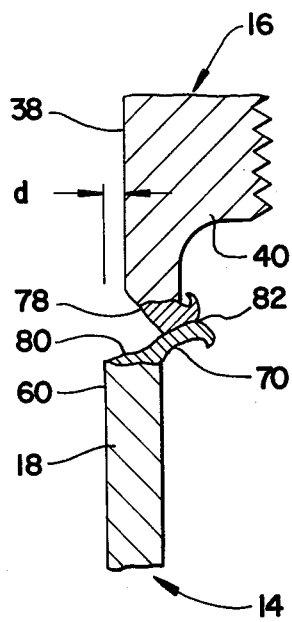
FIG. 6 is a fragmentary elevational cross-sectional view showing the skirt section of the nut element and the end turn of the helical coil after fracture of the weld and with slight expansion of the end turn of the coil.

As loading increases additional portions of the helical coil are caused to be brought into bearing engagement with the side wall. A point will be reached where the level of load is such that end turn 18 of helical coil 14 expands radially outwardly. Due to the degree of rigidity between the end turn 18 and nut element 16 after placement of weld 70 as shown in FIG. 5 a slight bending or outward expansion of end turn 18 will cause weld 70 to fracture at 82 (FIG. 6). The distance "d" of FIG. 6 reflects the transverse spacing of the surfaces 38, 60 and shows the degree of outward expansion of the end turn 18 relative to nut element 16. It should be remembered that in initial assembly of the helical anchor the surfaces 38, 60 are essentially coplanar as is shown in FIG. 5. With outward expansion of end turn 18 a transverse gap "d" is produced between the surfaces 38, 60 which is shown schematically in FIGS. 6-8.

Figure 7:
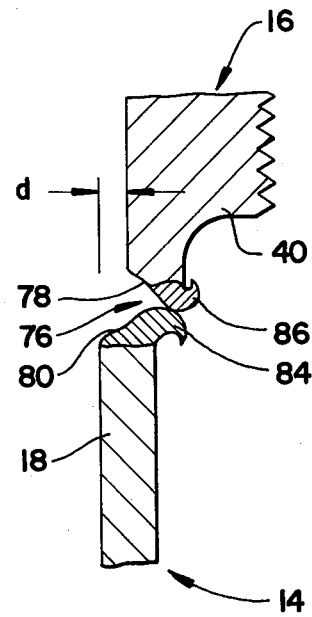
FIG. 7 is a fragmentary elevational cross-sectional view showing the skirt section of the nut element and the end turn of the helical coil after gross expansion of the end turn of the coil.

Upon the application of an increased degree of loading to the helical anchor the outward expansion of end turn 18 continues as is shown schematically in FIG. 7.

The continued application of loading to the helical anchor causes the nut element 16 to be drawn further into the helical coil 14. That is to say, the nut element 16 is caused to be drawn downwardly as viewed in FIG. 7. A downward movement of nut element 16 relative to end turn 18 produces an interaction between the ramp surfaces or walls 78, 80 defined by notch 76. As a consequence expansion means are provided whereby there is an outward bias or expansion force imparted to end turn 18 by means of nut element 16 which causes end turn 18 to be forced into gripping engagement with the side wall into which the helical anchor is received.

Figure 8:
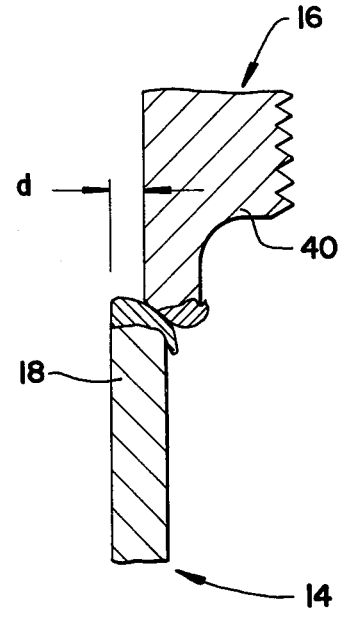
FIG. 8 is a fragmentary elevational cross-sectional view showing the skirt section of the nut element and the end turn of the helical coil after complete expansion of the coil and with the anchor under load.

The condition of the end turn 18 after final loading is shown in FIG. 8. It will be observed from FIG. 8 that maximum outward expansion of end turn 18 has taken place and that the skirt section 40 of nut element 16 is in intimate engagement with end turn 18.

The welded joint between nut element 16 and helical coil 14, as shown in FIG. 5, is fabricated to be strong in tension for facilitating initial installation of the helical anchor but deliberately weak in compression in order to provide for a sequential fracture of the weld during assembly. Notch 76 not only provides for a controlled weakening of the weld in order to facilitate fracture but also assures outward expansion of the end turn 18 after fracture due to the interaction of walls 78-80 defined by the notch.

The characteristics of the weld, its fracture during assembly and joint geometry all interact to both inhibit rotation of the nut during initial assembly of the anchor and assure expansion of the end turn of the coil during latter stages of assembly. As a consequence the full external area of the helical coil, including the end turn, is used for gripping engagement with the side wall into which the helical anchor is received.

It should be understood that only end turn 18 of helical coil 14 is welded or otherwise secured to nut element 16. Free end 54 (FIG. 9) of helical coil 14 is not secured to connecting bolt 12 but rather is freely disposed about the connecting bolt for outward movement into gripping engagement with side wall 20.

The metallurgical characteristics of weld 70 further contribute to the operation of the helical anchor of this invention. The degree of hardness of weld 70 exceeds the degree of hardness of the materials from which nut element 16 and end turn 18 are fabricated. As a consequence the interface between nut element 16 and end turn 18, during take-up as shown in FIG. 7, consists of abutting engagement of relatively hard portions 84, 86 of what was originally weld 70. Thus there is caused to be directed to the end turn 18 a substantial expansion force which is not otherwise absorbed by plastic deformation of either one of the elements 16, 18.

Notch 76 (FIG. 5) may take several different characteristic shapes depending upon desired conditions. For example it may be desirable to shape notch 76 such that wall 80 slopes in a downward direction generally parallel to wall 78. Alternate designs of the notch may be employed including notches in which the internal walls are curved.

FIG. 1 illustrates final assembly of the helical anchor with virtually the entire external surface of helical coil 14 in gripping engagement with the side wall into which the anchor is received.

The method of this invention is directed to method steps for the assembly of the helical coil 14 to the nut element 16. The method comprises the steps of:

(a) providing a helical coil 14 defined by a plurality of axially spaced turns including an end turn 18 and a plurality of adjacent turns, said end turn including an attachment area 68, said attachment area being substantially annular in configuration and being disposed substantially transverse to the axis of said helical coil;

(b) providing a nut element 16, said nut element defining at one end thereof a skirt section 40 which includes an attachment area 46, said attachment area being generally annular in configuration and being disposed substantially transverse to the axis of said nut element;

(c) welding said helical coil to said nut element at the respective attachment areas;

(d) placing a notch 76 in the welded subassembly in the vicinity of said weld.

While the structure and method of this invention have been described principally with reference to the process of friction welding of the helical coil to the nut element it should be appreciated that other welding techniques and, indeed, other fastening techniques may be employed to secure the end turn 18 of helical coil 14 to nut element 16. Friction welding is deemed to be advantageous for several reasons. First, the workpieces lend themselves to friction welding in view of the fact that the respective attachment areas 46, 68 may be readily brought into rotational engagement, one with respect to the other. Second, friction welding may be employed on an assembly line basis.

Within the spirit of this invention, however, should be considered other welding methods and, indeed, other securing methods including the use of adhesives.

While the preferred embodiment of the invention has been described principally with respect to the use of a generally flat helical coil it should be understood that other forms and shapes of coils may be employed including round coils and irregular shaped coils. Similarly while the preferred embodiment of the invention employs a helical coil, it should be understood that other coil forms may be used.

It should further be noted that while in the preferred embodiment nut element 16 is defined by a generally annular depending skirt section 40 defining attachment area 46 which is generally complementary to attachment area 68 of end turn 18, other shapes and forms of attachment areas may be considered including attachment areas which are not transverse to the axis of the helical anchor.

Figure 10:
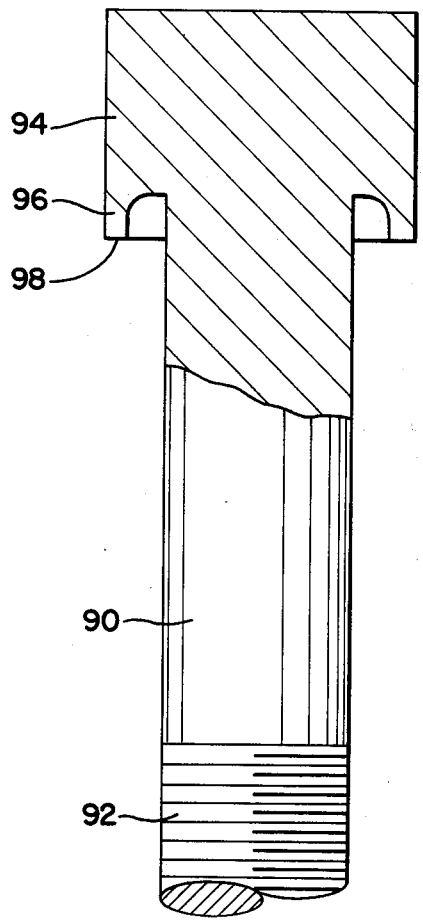
FIG. 10 is an elevational view partly in section showing a modification of the helical anchor of this invention.
Figure 11:
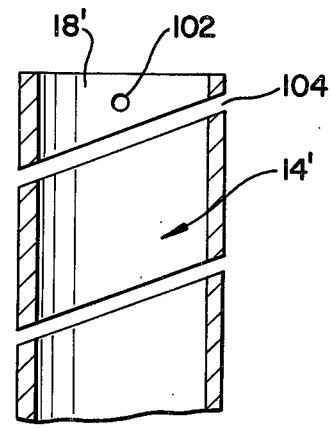
FIG. 11 is an elevational view partly in section showing a modification of the helical coil of this invention.
Figure 12:
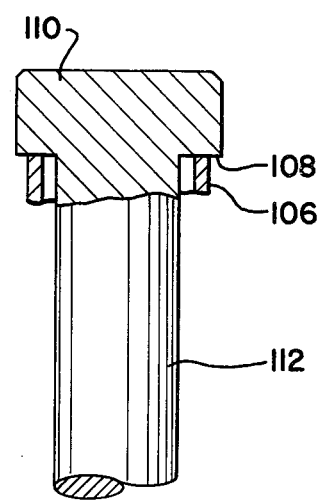
FIG. 12 is an elevational view partly in section showing a further modification of the helical anchor of this invention.

Several modifications of the invention are shown in FIGS. 10-12 and will now be described.

In FIG. 10 there is shown a modification of the invention in which the nut element is included as an integral part of the connecting bolt. The connecting bolt is generally designated 90 in FIG. 10 and includes external threads 92 at one end thereof for purposes of attachment of a suitable nut (not shown). At the inner end of the connecting bolt 90 there is provided an enlarged head 94 which is generally annular in configuration and includes a depending skirt section 96. It should be understood that skirt section 96 of FIG. 10 is generally similar to skirt section 40 of FIGS. 2-5. A generally transverse attachment area 98 is defined by skirt section 96 and is positioned essentially transverse to the axis of connecting bolt 90. Attachment area 98 of FIG. 10 is adapted to be received and attached to a complementary attachment area of the end turn 18 of helical coil 14 in the same manner as shown in FIGS. 3-5.

The structure of FIG. 10 is thus a stud-like element in which loading is accomplished by means of an attachment nut received on external threads 92 of bolt 90.

In FIG. 11 there is shown a modification of the helical coil of the invention. The structure of FIG. 11, which is generally designated 14', includes an end turn 18' which is provided with a perforation or cutout portion 102 which is defined in the helical coil. In the embodiment of FIG. 11 perforation 102 extends generally adjacent the gap spacing 104 between adjacent turns of the coil. Perforation 102 functions to weaken the helical coil in order to facilitate the outward expansion of the coil during take-up of the anchor. The design of the perforation shown in FIG. 11 is for purposes of illustration only. Alternate designs may be employed including circular perforations and irregular shaped perforations. Similarly, the positioning of the perforation may take several different forms depending upon conditions and the desired result.

In FIG. 12 a further modification of the invention is shown in which the helical anchor is attached to the underside of the head of a fastener. The helical anchor is designated 106 in FIG. 12 and is attached to the undersurface 108 of head 110 by means of a weld. The shank of the fastener is designated 112 and is generally smooth in exterior configuration being received within the helical coil 106.

In order to facilitate take-up of the structure of FIG. 12 there are provided one or more tangs or projections extending radially outwardly from the helical coil 106. Such tangs or projections are adapted to bite into the wall into which the anchor is received. Accordingly, after insertion of the anchor into the wall the engagement of the tangs with the wall inhibits rotation of the helical coil as a wrench or other turning implement is applied to head 110. Accordingly, with rotation of head 110 there is achieved an outward expansion of the coil into tight gripping engagement with the side wall. After fracture of the weld (in the manner shown in FIGS. 6-8) contact of the coil with the head is maintained by the frictional engagement of these elements.

What is claimed is:

1. A helical anchor comprising in combination:
a connector element having a first end and a second end;
a helical coil surrounding said connector element, said helical coil having a plurality of axially spaced turns including an end turn and a plurality of adjacent turns, said coil adapted to expand radially outwardly into gripping engagement with a side wall into which said anchor is received;
a bearing element;
first connection means rotatably securing said bearing element to said connector element at said first end thereof;
second connection means securing said bearing element to said coil at said end turn thereof, said second connection means being defined by at least one fracturable weld interconnecting said bearing element and said coil;
fracture means associated with said weld to promote the fracture thereof during installation;
expansion means providing for the outward expansion of said end turn of said coil after take-up of said anchor has resulted in the fracture of said weld;

said expansion means also acting to inhibit rotation of said bearing element after fracture of said weld.

2. The invention of claim 1 in which said first connection means is defined by interconnecting threads of said bearing element and said connector element.

3. The invention of claim 1 in which said second connection means is defined as an annular weld interconnecting annular portions of said bearing element and said end turn of said coil.

4. The invention of claim 1 in which said fracture means is defined by a notch located at said weld.

5. The invention of claim 4 in which said expansion means is defined as an inclined surfaces defined by said notch.

6. A helical anchor comprising in combination:
a connector element having a first end and a second end;
a helical coil surrounding said connector element, said helical coil having a plurality of axially spaced turns including an end turn and a plurality of adjacent turns, said coil being adapted to expand radially outwardly into gripping engagement with a side wall into which said anchor is received;
a bearing element, said bearing element having at one end thereof a depending skirt section defining an attachment area;
first connection means rotatably securing said bearing element to said connector element at said first end thereof;
second connection means securing said bearing element to said coil at said end turn thereof, said second connection means including an attachment area defined by said end turn of said coil, said attachment area of said end turn being secured to said attachment area of said skirt section by means of a fracturable weld;
fracture means associated with said weld to promote the fracture thereof during installation;
expansion means providing for the outward expansion of said end turn of said coil after take-up of said anchor.

7. The invention of claim 6 in which said attachment area of said skirt section is equal to said attachment area of said end turn.

8. The invention of claim 6 in which said expansion means provides for the outward expansion of said end turn of said coil after take-up of said anchor has resulted in the fracture of said weld.

9. The invention of claim 8 in which said expansion means is defined as opposed ramp surfaces of said end turn and said skirt section.

10. A method of assembly of a helical coil to a nut element for use in a helical anchor assembly comprising a helical coil, nut element and connecting bolt, said method comprising the steps of:
(a) providing a helical coil defined by a plurality of axially spaced turns including an end turn and a plurality of adjacent turns, said end turn including an attachment area, said attachment area being substantially annular in configuration and being disposed substantially transverse to the axis of said helical coil;
(b) providing a nut element, said nut element defining at one end thereof a skirt section which includes an attachment area, said attachment area being generally annular in configuration and being disposed substantially transverse to the axis of said nut element;
(c) welding said helical coil to said nut element at the respective attachment areas;
(d) providing fracture means associated with said weld to promote the fracture thereof during installation.

11. The method of claim 10 in which said welding step is carried out by friction welding.

12. The method of claim 10 in which the step (d) is carried out by placing a notch in the welded subassembly at said weld.

13. A helical coil and nut element subassembly for a helical anchor assembly which includes a helical coil, nut element and connecting bolt, said subassembly comprising in combination;
a helical coil having a plurality of axially spaced turns including an end turn and a plurality of adjacent turns, said coil adapted to surround a connecting bolt and expand radially outwardly into gripping engagement with a side wall into which the anchor assembly is received, said end turn of said helical coil defining a generally annular area;
a nut element having internal threads adapted to cooperate with a connecting bolt and a skirt section extending from one end thereof, said skirt section defining a generally annular attachment area;
said helical coil and said nut element being secured together by means of a fracturable weld interconnecting said attachment area of said helical coil and said attachment area of said nut element;
a generally annular notch defined in one or both of said end turn of said helical coil and said nut element at approximately said fracturable weld, said notch promoting fracture of said weld and providing for expansion means for the outward expansion of said end turn of said coil after take-up of said anchor has resulted in the fracture of said weld.

* * * * *